United States Patent [19]

Tolbert, Jr.

[11] 3,747,642
[45] July 24, 1973

[54] THROTTLE NOTCHES FOR CONTROL VALVE SPOOLS
[75] Inventor: William N. Tolbert, Jr., Pewaukee, Wis.
[73] Assignee: Koehring Company, Milwaukee, Wis.
[22] Filed: Oct. 26, 1971
[21] Appl. No.: 192,179

[52] U.S. Cl............................ 137/625.69, 137/625.3
[51] Int. Cl.......................... F16k 1/00, F16k 11/07
[58] Field of Search.................... 137/625.69, 625.3, 137/625.37; 251/282, 324, 21

[56] References Cited
UNITED STATES PATENTS

| | | | |
|---|---|---|---|
| 3,525,500 | 8/1970 | Bender | 137/625.69 X |
| 2,747,612 | 5/1956 | Shih-Ying Lee | 251/324 |
| 2,812,775 | 11/1957 | Hodgson | 137/625.69 |
| 2,971,536 | 2/1961 | Junck et al. | 251/282 |
| 3,009,480 | 11/1961 | Miller | 251/282 X |
| 3,123,335 | 3/1964 | Darling | 251/282 |
| 3,198,212 | 8/1965 | Junck et al. | 137/625.69 X |

*Primary Examiner*—Henry T. Klinksiek
*Assistant Examiner*—Robert J. Miller
*Attorney*—Ira Milton Jones

[57] ABSTRACT

A control spool for directional control and/or pressure compensating valves having lands with throttle notches in their ends. The notches open outwardly to the periphery of their lands and axially to adjacent circumferential grooves in the spool. A post fixed in the bottom of each notch projects outwardly therefrom, away from the spool axis, in spaced relation to the side wall of the notch. The post can be cylindrical, and it can also be tilted to dispose its inner end a greater distance from the end of the land than its outer end. The side wall of the notch is concentric to the post.

10 Claims, 5 Drawing Figures

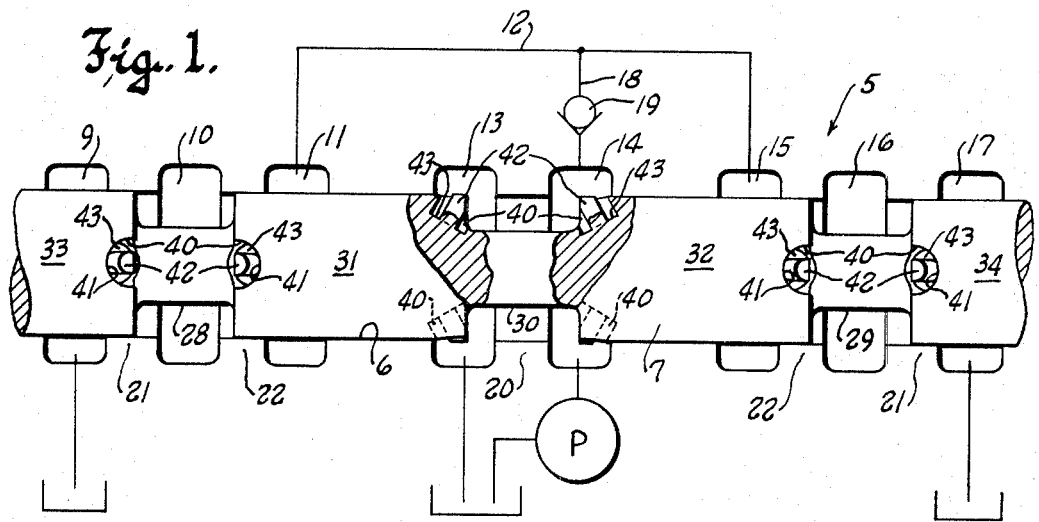

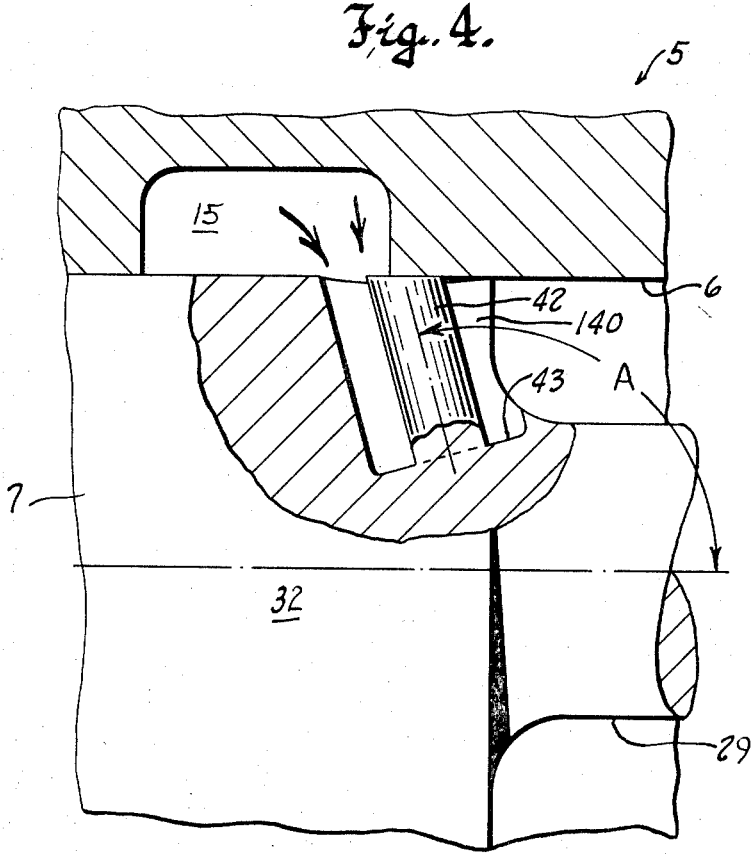
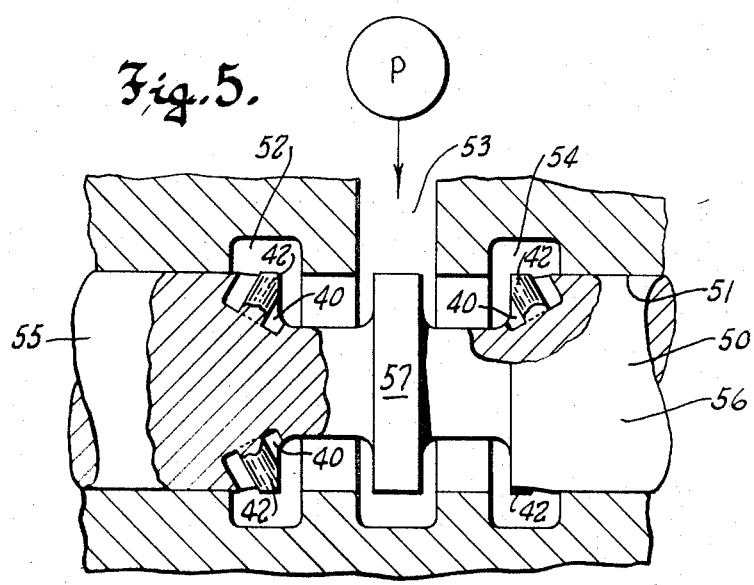

THROTTLE NOTCHES FOR CONTROL VALVE SPOOLS

BACKGROUND OF THE INVENTION

This invention relates to control valves for fluid pressure actuatable systems, of the type having a body with a bore and a valve spool slidable therein to operating positions communicating service passages with pressure fluid supply and/or return passages in the body. These passages open to the bore at axially spaced locations, and they are selectively communicable with one another through circumferential grooves in the spool, depending upon which of two operating positions to which the spool is moved from a neutral position therebetween.

As is well known, the speed at which a fluid motor is operated depends upon the rate at which pressure fluid is delivered thereto from the service passages of the valve controlling the motor. In turn, the fluid flow rate depends upon the extent the valve spool is shifted away from neutral toward one or the other of its operating positions. The flow rate will increase as the spool is moved farther from neutral, and vice versa.

However, the rate of flow ordinarily tends to change too abruptly with only slight movements of the valve spool. For that reason, valve spools are customarily provided with throttle notches in the ends of their lands, to effect more gradual increases and/or decreases in flow rates, depending upon whether the spool is moved away from or toward neutral. The throttle notches thus not only enable the speed of motor operation to be closely controlled, but also assist in minimizing shock pressures in the governed system, especially in one that is hydraulically operated, resulting from spool movement toward and from its operating positions.

Various shapes and designs of throttle notches have been resorted to in the past in an effort to reduce the axial momentum or reaction forces on the valve spool created as an incidence to flow of high pressure fluid past the ends of the lands on the spool, to or from the bore in which the spool operates. These axial forces are greatest when the valve spool occupies a flow metering position displaced only a short distance out of neutral. The objective in reducing these momentum forces, of course, is to make possible actuation of the valve spool with a minimum of effort.

Some of the throttle notch configurations that have been proposed to reduce the axial momentum forces on the valve spool and make it easier to actuate are disclosed in the patents to Junck et al. U.S. Pat. Nos. 2,971,536 and 3,198,212, Miller U.S. Pat. No. 3,009,480, Darling U.S. Pat. No. 3,123,335 and Shih-Ying Lee U.S. Pat. No. 2,747,612. None of these patentees, however, has succeeded in reducing spool actuating effort to any significant degree.

This was due to the fact that the notches were useful only when they allowed a limited flow of fluid therethrough. Their beneficial effects were diminished with increasing fluid flow through them, and almost lost entirely when the valve spool was in a position allowing a large volume of fluid to flow through the increased notch opening.

SUMMARY OF THE INVENTION

This invention has as one of its objectives the provisions of a valve spool which can be moved toward and from its operating positions with extremely low effort.

More specifically, it is an object of this invention to effect a great reduction in the axial momentum forces imposed upon valve spools through the provision of throttle notches of a radically different design in the ends of the spool lands.

For the above purpose, this invention provides a valve spool with throttle notches that open to the periphery of their respective lands and to the circumferential grooves adjacent thereto, and which notches have posts fixed in their bottoms and projecting outwardly to the periphery of the land in spaced relation to the sides of their notches.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

BRIEF DESCRIPTION OF THE DRAWINGS

The accompanying drawings illustrate several examples of embodiments of the invention constructed according to the best modes so far devised for the practical application of the principles thereof, and in which:

FIG. 1 is a more or less diagrammatic view of a hydraulic control valve equipped with a valve spool of this invention; portions of the spool being broken away and shown in section;

FIG. 2 is an enlargement of a portion of the valve of FIG. 1, showing the valve spool in a metering position restricting fluid flow to a substantial degree;

FIG. 3 is a view similar to FIG. 2, but showing the valve spool in another metering position restricting flow to a lesser extent;

FIG. 4 is a view on the order of FIG. 2, illustrating how the throttle notches in the spool can be disposed at a different angle to the spool axis; and FIG. 5 is a fragmentary view diagrammatically illustrating throttle notches of this invention embodied in a different type of spool.

DESCRIPTION OF THE PREFERRED EMBODIMENTS

Referring now to the accompanying drawings, the numeral 5 generally designates a control valve comprising a body having a bore 6 and a valve spool 7 slidable axially in the bore from a neutral position (shown) to operating positions at opposite sides of neutral to provide for communication through the bore between various service, supply and return passages which open to the bore through enlargements thereof at axially spaced locations along its length. Reading from left to right, these passages comprise one branch 9 of a return passage; a first service passage 10; one leg 11 of an inverted U-shaped bridge or feeder passage 12; the downstream branch 13 of a supply passage; the upstream branch 14 of the supply passage; the other leg 15 of the feeder passage 12; a second service passage 16; and a second branch 17 of the return passage. A passageway 18 connects the upstream supply passage 14 with the bight of the bridge passage 12 through a load holding check valve 19.

Those portions of the bore 6 extending between adjacent enlargements at the terminal ends of passages 9 to 13 can be said to define body lands. One such body land 20 is located between supply passage branches 13 and 14, and each service passage 10,16 is flanked by a pair of such body lands 21, 22.

The valve spool 7 is formed with four lands and three circumferential grooves. In the neutral position of the spool shown, two of these grooves 28 and 29 are in register with service passages 10 and 16, respectively, and the third groove 30 is in register with the supply passage and has a length sufficient to afford communication between the upstream and downstream branches 13 and 14 thereof. Lands 31 and 32 lie at opposite sides of the center groove 30, and lands 33 and 34 are located axially outwardly of grooves 28 and 29 respectively.

The upstream branch 14 of the supply passage leads to the inlet of the control valve to receive pressure fluid from a pump P. In an open center valve such as shown by way of illustration, the output of the pump P is returned to tank through the downstream branch 13 of the supply passage, via the center groove 30 in the valve spool and its bore 6 when the spool is in its neutral position. At that time, the spool lands block communication between the service passages 10, 16 and the feeder and return passages at either side thereof.

As is customary, the spool can be shifted to operating positions at opposite sides of neutral to close off communication between the upstream and downstream supply passage branches 13 and 14 and to divert supply fluid to a selected one of the service passages while at the same time communicating the non-selected service passage with its adjacent return passage. In one such operating position, for example when the spool is shifted to the right of neutral, pressure fluid in the supply passage branch 14 is diverted into passage 18 for flow to the service passage 10 through check valve 19, bridge leg 11, and spool groove 28 then communicating passages 10 and 11 through bore 6. At the same time, return fluid in service passage 16 can flow to return passage branch 17 through spool groove 29 then communicating those passages through bore 6.

These connections between the service passages and the supply and return passages are reversed when the valve spool is shifted to an operating position to the left of neutral.

In spool valves of this nature, the rate at which pressure fluid is allowed to flow to and from the governed fluid motor is customarily controlled by throttle notches in the ends of the lands on the spool. In the past, most, if not all, of the pressure fluid flowing to the motor was constrained to pass through certain throttle notches and the remainder of the pressure fluid entering the inlet of the valve was returned to tank. Such throttle notches also tended to gradually establish communication between the various passages in the valve body and thus prevented abrupt shock pressures in the hydraulic system governed by the valve.

Various types of throttle notches have been proposed heretofore in an effort to eliminate objectionable axial momentum or reaction forces imposed upon the valve spool during rapid flow of pressure fluid from one passage to another through the circumferential grooves in the valve spool. As is well known, such axial momentum forces were greatest when the valve spool was in a partial metering position in its bore at which some of the pressure fluid flowing from passage to passage was constrained to flow through the throttle notches, and the remainder of such fluid flowed past the end of the land containing the notches, in bypass relation thereto.

Tests have shown most convincingly that when the ends of the spool lands are provided with throttle notches 40 of this invention, the axial momentum forces imposed upon the spool in all metering positions thereof are reduced to a minimum.

Each such throttle notch comprises a well in the end portion of its land, having a concave or substantially semicylindrical side wall 41 and a post 42 in its center, fixed with respect to the spool. The well opens outwardly to the periphery of the land and axially to the adjacent circumferential groove in the spool. The bottom 43 of the well has been shown as flat, although a flat bottom is not essential. The side wall 41 of the well can be substantially perpendicular to the bottom 43 of the well.

To facilitate manufacture, the post 42 can have a cylindrical shape (as shown), and it projects outwardly from the bottom of the well to the periphery of the land in spaced coaxial relation to the side wall 41. It can have a diameter of approximately one-third to about three-quarters that of the side wall 41 of the notch. If its diameter is substantially less than one-third that of the side wall, its effectiveness is impaired.

The angle at which the post is disposed is not in anywise critical. Its axis can be tilted at an angle A (see FIGS. 2 and 3) ranging from about 30° to 90° to the spool axis, or even greater than 90° (as seen in FIG. 4). However, angles greater than 90° have been found to work better at those locations where pressure fluid flows through the notch from the periphery of its land toward the adjacent circumferential groove in the spool. Angles of tilt in the neighborhood of 45° to 90° have been found most desirable for those lands where pressure fluid flows outwardly through the notches, from the circumferential spool grooves adjacent thereto, toward the periphery of the spool. Angles A of less than 30° while still satisfactory tend to be less desirable, as the outer edge of the notch most distant from the end of the land then becomes so thin as to be susceptible to breakage under high fluid pressure forces thereon.

It should be observed that the notch shown has a circular bottom 43 which, of course, depends upon the axial depth of the well defining the notch. However, the axial dimension of the well depends primarily upon the volume of fluid that is required to flow therethrough in the metering positions of the spool. The greater the axial depth of the well, the greater will be the metering range of the spool, and vice versa.

FIGS. 2 and 3 show the right hand end of spool land 31 provided with a throttle notch having its post tilted at an angle A of about 60°, with the post axis receding from the adjacent end of the land toward the bottom of the post. Any such angle of less than 90°, of course will dispose the bottom of the post farther from the end of its land than the outer end of the post. As seen, the outer end portion of the post can be defined in part by the adjacent end of its land and in part by the periphery of its land.

In the severe metering position of the valve spool seen in FIG. 2, part of the pressure fluid entering supply passage branch 14 will flow through the space in bore 6 defined by the circumferential groove 30, and the throttle notch 40 in the right hand end of land 31, around the post 42 in said notch, and into the downstream branch 13 of the supply passage in bypass relation to the feeder passage 12. The remainder of the supply fluid in the upstream branch 14 of the supply passage will be diverted into the feeder passage 12 for flow to the service passage 10 via bridge leg 11 and the groove 28 in the valve spool then spanning passages 10 and 11. Return fluid in service passage 16 can pass into return passage branch 17 in that same position of the valve spool.

In FIG. 2, the arrow 45 portrays this flow of pressure fluid into the throttle notch 40 from groove 30. Arrows 46 and 47 indicate how pressure fluid debouches from the throttle notch 40, at angles which diverge from the adjacent end of the land 31 when only a small area of the notch at the periphery of said land is open to the passage 13. Due to the presence of the post, a small amount of fluid as represented by the arrow 46 issues from the notch as a substantially narrow central jet stream from a localized zone along the outer edge of the notch most distant from the groove 30, and in a plane containing the axes of the valve spool and the post 42. This jet stream issues from the notch at a divergent angle to the adjacent end of the body land 20, and which is approximately 70° to the spool axis.

The larger volume of fluid represented by the heavier arrow 47 issues in a pair of substantially widely divergent radially disposed fan-like streams at circumferentially opposite sides of the center stream, from those portions of the notch closer to the left hand end of the body land 20. Parts of those flanking streams closest to the body land 20 will be normal to the spool axis, while those parts of the flanking streams most distant from the body land 20 and diverging therefrom will be at angles of about 80° to the spool axis. Hence, most of the dynamic reaction force on the spool resulting from such flow of fluid into the lower pressure downstream supply passage branch 13 is imposed nearly radially upon the spool. These nearly radial dynamic reaction forces are offset by identical forces imposed on the spool in consequence of flow of pressure fluid into passage 13 from the diametrically opposite throttle notch in the spool, as seen in FIG. 1.

In FIG. 2, the right hand end of the spool land 31 is shown disposed a distance within the body land 20, so that only a small area of the diametrically opposite throttle notches are open to passage 13. In FIG. 3, however, the valve spool is shown in a metering position at which the right hand end of the spool land 31 is nearly flush with the left hand end of the body land 20, permitting a greater volume of supply fluid to flow through the notches 40 to the downstream branch 13 of the supply passage. A correspondingly lesser amount of pressure fluid can then flow to the service passage 10.

Tests have shown that due to the presence of the posts 42, the pressure fluid then issuing from each notch 40 in the right hand end of spool land 31 will again comprise the same small volume center jet stream 46, and a pair of fan shaped streams such as indicated by the three heavier arrows 48, at circumferentially opposite sides of the center stream 46. While the flanking streams 48 now have greater arcuate length as measured along the curved outer edge of the notch 40, they are considerably less divergent than before.

Again, the bulk of the fluid issuing from the diametrically opposite notches and indicated by the arrows 48 flows along lines which approach normalcy to the spool axis, so that only insignificant axial momentum forces are imposed upon the spool.

FIG. 4 illustrates a throttle notch 140 of this invention which is disposed an an angle A to the spool axis slightly greater than 90°. Throttle notches tilted at such an angle can be used instead of the notches 40 if desired, but not necessarily to any greater advantage except at locations where pressure fluid flows through them into one of the spool grooves, from one of the body passages. These locations for example, can be where pump fluid from either leg of the bridge passage 12 flows to a selected one of the service passages. In such cases, whether notches 40 or 140 are provided for flow of pressure fluid therethrough to the adjacent spool groove, the radial dimension of the notches is preferably made somewhat greater.

Regardless of whether fluid flow through the throttle notches is outwardly from the spool grooves or inwardly into the grooves, the posts 42 in the throttle notches have been found to consistently effect a significant reduction in axial momentum forces on the valve spool in any metering position thereof. In contrast, when a valve spool provided with conventional throttle notches is moved from a first to a second metering position to increase fluid flow through the notches from any spool groove to a passage at the exterior of the spool, the angle (complementary to angle A) of the fluid jet stream issuing from the notches decreases. This indicates that the effect of the notches decreases with increasing fluid flow through them, and that they are effective primarily when employed to severely limit fluid flow therethrough.

With the valve spool of this invention, however, the bulk of the fluid flowing outwardly away from the periphery of the spool from the throttle notches (see FIGS. 2 and 3) will be in two fan-like streams at opposite sides of a small central jet stream. The portions of these fan-like streams closest to the narrow central jet will be at angles of only a few degrees out of normal to the spool axis, while those portions closest to the body land will be normal to the spool axis. With increased opening of the throttle notches, of course, the arc of these fan-shaped jets increases, but their angular disposition remains the same due to the presence of the posts 42. Hence, it can be said that the posts serve to maintain the integrity of the orifices defined by the throttle notches regardless of the size of said orifices.

Again referring to FIGS. 2 and 3, it is believed that fluid at high pressure in any spool groove 30 flowing through each throttle notch 40 to a passage 13 at lower pressure, will be deflected by the post 42 at the entrance to the notch and divided thereby into two streams that pass around opposite sides of the post; and that the concave side wall of the notch causes these streams to converge and collide with one another at a zone behind the post, at that part of the notch most distant from the end of its land 31. The fluid constantly flowing to said zone behind the post seems to act more or less like a baffle or as if a solid wall was present behind the post, since except for the thin central jet stream, it constrains the fluid debouching into passage 13 to take the form of a pair of divergent fan-like jet streams 47, 48 at opposite sides of a plane containing the axes of the spool and the post.

As the spool is moved to increase the size of the orifice provided by the notch, the greater flow rate therethrough increases the arc of the fan-like streams issuing from the notch without substantially diminishing the effect of the barrier behind the post at the zone of confluence between the streams of fluid passing around it. Aside from being present in greater arcs, these fan-like jet streams still maintain the most favorable angles to the spool axis necessary for minimization of the axial momentum forces on the spool.

The end result is the provision of a throttle notch capable of metering from small to large flows of fluid while maintaining a most significant reduction in axial jet forces on the valve spool.

As indicated earlier, the throttle notches of this invention also serve to significantly reduce the less troublesome axial momentum forces on the valve spool during reverse flow therethrough, from a passage at the exterior of the spool to a circumferential groove in the spool. During such reverse flow through the notches the posts therein serve to deflect the fluid flowing into the notches and to redirect the fluid debouching into the circumferential spool grooves therefrom. As a result, there is more of a tendency to create counteracting axial forces on the spool, which largely nullify one another.

It should here be observed that the throttle notches of this invention can be provided in the lands of the pressure actuatable plungers in pressure compensating valves, as well as in those of valve spools.

Another arrangement of lands and throttle notches 40 is shown in the spool type valve element 50 in FIG. 5. In this case, the valve element can be that of a control valve or of a pressure compensating valve mechanism. For purposes of illustration, the valve element 50 is shown as slidable axially in a bore 51 having three axially spaced enlargements representing passages 52, 53 and 54. The center passage 53 can be a pressure fluid supply passage, and in the case of a directional control valve, the two flanking passages 52 and 53 can comprise branch passages which join with one another downstream from the bore 51. Their junction can communicate with another supply passage (such as 51) in a downstream valve section to make pressure fluid available to the service passages governed by a valve spool in that downstream valve section.

In the case of a pressure compensating valve, one of the flanking passages, 52 for example, can comprise a work port and the other passage 54 a bypass port.

In either event, throttle notches 40 of this invention in the ends of lands 55 and 56 which lie at opposite sides of a center land 57, will serve to significantly reduce axial jet forces on the valve element 50, in any metering position thereof, regardless of the direction of fluid flow through those notches.

From the foregoing description, together with the accompanying drawings, it will be readily apparent to those skilled in the art that this invention provides a throttle notch construction for valve spools and the like by which significant reductions can be effected in the dynamic reaction forces on the spool when the latter occupies any of various metering positions in its bore.

I claim:

1. A valve spool, characterized by:
   A. a land on the spool having one end adjoining a circumferential groove in the spool;
   B. a throttle notch in said end of the land opening outwardly to the periphery thereof and axially to said groove;
   C. and a post fixed in the bottom of the notch and projecting outwardly therefrom in spaced relation to the sides of the notch.

2. The valve spool of claim 1, wherein the notch has a side wall which is substantially uniformly spaced from the exterior of the post.

3. The valve spool of claim 2, wherein the post is substantially cylindrical.

4. The valve spool of claim 1, wherein the post is tilted to dispose its inner an outer end portions different distances from said end of the land.

5. The valve spool of claim 4, wherein the post is tilted at an angle which disposes its inner end portion a greater distance from said end of the land than its outer portion.

6. The valve spool of claim 5, wherein the post is tilted at an angle of not less than 30° to the spool axis, and said side wall of the notch is spaced a uniform distance from the exterior of the post.

7. The valve spool of claim 6, wherein the outer end portion of the post is defined in part by the periphery of the land and in part by said end of the land.

8. The valve spool of claim 1, wherein the post is substantially cylindrical and said side wall of the notch is substantially concentric thereto; and wherein the diameter of the post is from one-third to about three-quarters that of the notch.

9. A valve spool, characterized by:
   A. a land on the spool having one end adjoining a circumferential groove in the spool;
   B. a throttle notch in said end of the land opening outwardly to the periphery thereof and axially to said groove;
   C. and flow deflecting means in said notch, fixed with respect to the spool and projecting upwardly from the bottom of the notch to cooperate with surfaces thereof in deflecting fluid entering the notch and redirecting the discharge of such fluid from the notch at angles which minimize axial flow forces on the spool.

10. The spool of claim 9, wherein said flow deflecting means is spaced from the sides of the notch.

* * * * *